(12) United States Patent
Zhuang et al.

(10) Patent No.: US 11,323,992 B2
(45) Date of Patent: May 3, 2022

(54) METHOD FOR DETECTING DOWNLINK CONTROL INFORMATION, TERMINAL DEVICE, AND NETWORK DEVICE

(71) Applicant: Huawei Technologies Co., Ltd., Shenzhen (CN)

(72) Inventors: Hongcheng Zhuang, Dongguan (CN); Yunbo Han, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 111 days.

(21) Appl. No.: 16/638,823

(22) PCT Filed: Oct. 23, 2018

(86) PCT No.: PCT/CN2018/111434
§ 371 (c)(1),
(2) Date: Feb. 13, 2020

(87) PCT Pub. No.: WO2019/080836
PCT Pub. Date: May 2, 2019

(65) Prior Publication Data
US 2020/0196285 A1 Jun. 18, 2020

(30) Foreign Application Priority Data

Oct. 24, 2017 (CN) .......................... 201710996490.9
Dec. 25, 2017 (CN) .......................... 201711427739.0

(51) Int. Cl.
*H04W 72/04* (2009.01)

(52) U.S. Cl.
CPC ....... *H04W 72/042* (2013.01); *H04W 72/044* (2013.01)

(58) Field of Classification Search
CPC ... H04L 5/0089; H04L 5/0053; H04L 5/0007; H04W 72/08; H04W 72/042; H04W 72/044; H04W 72/04; H04W 28/20
See application file for complete search history.

(56) References Cited

U.S. PATENT DOCUMENTS

2014/0119335 A1 5/2014 Wang et al.
2016/0323858 A1 11/2016 Seo et al.
(Continued)

FOREIGN PATENT DOCUMENTS

CN 102711248 A 10/2012
CN 103460770 A 12/2013
(Continued)

OTHER PUBLICATIONS

NTT Docomo, Inc., "Summary of key aspects for search space," R1-1718834, 3GPP TSG RAN WG1 Meeting 90bis, Prague, CZ, Oct. 9-13, 2017, 22 pages.
(Continued)

*Primary Examiner* — Pankaj Kumar
*Assistant Examiner* — Kenneth P Hunt
(74) *Attorney, Agent, or Firm* — Conley Rose, P.C.

(57) ABSTRACT

A method for detecting downlink control information includes receiving, by a terminal device from a network device, detection related information for detecting downlink control information (DCIs) of all bandwidth parts (BWPs), where the detection related information is determined by the network device based on resource load of control resource (Continued)

sets of all the BWPs, and detecting, by the terminal device, each of the DCIs based on the detection related information.

20 Claims, 8 Drawing Sheets

(56) References Cited

U.S. PATENT DOCUMENTS

| | | | |
|---|---|---|---|
| 2018/0049203 A1* | 2/2018 | Xue | H04L 5/0053 |
| 2019/0124631 A1* | 4/2019 | Ren | H04W 72/042 |
| 2019/0334687 A1* | 10/2019 | Su | H04L 5/0094 |
| 2020/0029315 A1* | 1/2020 | Lin | H04L 5/0051 |
| 2020/0084752 A1* | 3/2020 | Strom | H04L 1/1614 |
| 2020/0205142 A1* | 6/2020 | Gao | H04L 5/0048 |
| 2020/0236697 A1* | 7/2020 | Takeda | H04W 76/11 |

FOREIGN PATENT DOCUMENTS

| | | |
|---|---|---|
| CN | 104205685 A | 12/2014 |
| WO | 2013008958 A1 | 1/2013 |

OTHER PUBLICATIONS

NTT Docomo, Inc., "Remaing issues on bandwidth parts for NR," R1-1713964, 3GPP TSG RAN WG1 Meeting #90, Prague, Czech Republic, Aug. 21-25, 2017, 5 pages.

Samsung, "On Search Space Design," R1-1715979, 3GPP TSG RAN WG1 Meeting NR#3, Nagoya, Japan, Sep. 18-21, 2017, 8 pages.

Spreadtrum Communications,"Discussion on search space design," R1-1717748, 3GPP TSG RAN WG1 Meeting 90bis,Prague, Czech Republic, Oct. 9-13, 2017, 4 pages.

"3rd Generation Partnership Project; Technical Specification Group Radio Access Network; Study on New Radio Access Technology Physical Layer Aspects (Release 14)," 3GPP TR 38.802 V14.2.0, Sep. 2017, 143 pages.

R1-1715692, Guangdong OPPO Mobile Telecom, "Remaining issues on bandwidth part configuration and activation", 3GPP TSG RAN WG1 Meeting NR#3, Nagoya, Japan, Sep. 18-21, 2017, 4 pages.

R1-1717062 Huawei, et al., "Coreset configuration and search space design", 3GPP TSG RAN WG1 Meeting #90bis, Prague, Czech Republic, Oct. 9-13, 2017, 14 pages.

* cited by examiner

METHOD FOR DETECTING DOWNLINK CONTROL INFORMATION, TERMINAL DEVICE, AND NETWORK DEVICE

CROSS-REFERENCE TO RELATED APPLICATION

This application is a national stage application of International Patent Application No. PCT/CN2018/111434, filed on Oct. 23, 2018, which claims priority to Chinese Patent Application No. 201711427739.0, filed on Dec. 25, 2017 and Chinese Patent Application No. 201710996490.9, filed on Oct. 24, 2017. All of the aforementioned applications are hereby incorporated by reference in their entireties.

TECHNICAL FIELD

This application relates to the communications field, and in particular, to a method for detecting downlink control information, a terminal device, and a network device.

BACKGROUND

To better meet an increasing requirement for service types, a new access technology such as a new radio (New Radio, NR) technology may support a plurality of service types. The service types each have different requirements for system parameters such as a sub-carrier spacing, a symbol length, and a time unit. Therefore, flexible configuration of system parameters such as a carrier spacing, a symbol length, and a time unit is considered in an NR design. In addition, to support a higher-rate service, the NR needs to support a high bandwidth such as 100 MHz or 400 MHz, but a bandwidth capability of a terminal device is limited. Therefore, the NR supports configuration of a bandwidth part (bandwidth part, BWP), and may configure a plurality of BWPs for UE on a carrier of one bandwidth. The UE sends and receives data at an activated BWP. For the terminal device, whether there is data that needs to be received or scheduled for transmission at a transmission time interval (Transmission Time Interval, TTI) depends on whether the terminal device can detect a control message that includes scheduling information. Therefore, in long term evolution (Long Term Evolution, LTE), the terminal device needs to blindly detect a physical downlink control channel (Physical Downlink Control Channel, PDCCH) at each TTI. After downlink control information (Downlink Control Information, DCI) is detected on the PDCCH, the terminal device receives or sends data based on the DCI. If a plurality of carriers are configured for the terminal device, DCIs of the carriers need to be detected on each activated carrier.

In a case of a plurality of BWPs, for example, a plurality of BWPs may be simultaneously activated for one carrier, or one BWP may be activated for each carrier in a case of carrier aggregation, and the terminal device needs to simultaneously detect DCIs of the plurality of BWPs. In this way, a quantity of times for blind detection performed by the terminal device on the DCIs is multiplied, and a new DCI detection method is required. As shown in FIG. 1, in a coordinated multi-point transmission scenario, the following solution is proposed: A plurality of DCIs corresponding to a same carrier are sent to the terminal device, and are respectively corresponding to a plurality of non-quasi-co-located (Quasi Co-Located, QCL) stations that perform transmission on a same time-frequency resource, indicating a quantity of precoding layers, a code word, and a port correspondence that are corresponding to a physical downlink shared channel (Physical Downlink Shared Channel, PDSCH) sent by each station, so as to support multi-point diversity transmission and coordinated multi-point multi-stream transmission. The downlink control channel design method based on the coordinated multi-point transmission solution may be that a serving base station or a central scheduler indicates, to a terminal device, a quantity N of DCIs to be blindly detected in a search space of the terminal device. In a case, N is a fixed value, and the terminal device determines a size of N by using a transmission mode indicated by the serving base station. For example, when coordinated multi-point multi-stream transmission or coordinated multi-point diversity transmission is used by default, there are two transmission points for coordinated transmission, and when the base station notifies the terminal device of a current transmission mode, it means that N is equal to 2. In another case, N is dynamic, and the serving base station may indicate, to the terminal device in advance by using higher layer signaling, a quantity N (N>1) of transmission points participating in multi-point coordination. A quantity of actually sent DCIs depends on a current scheduling policy, for example, when there are two transmission points for coordinated transmission, N is equal to 2. In this scenario, only a quantity of DCIs for scheduling a PDSCH is considered, but a relationship between a plurality of DCIs is not included, and blind detection of the DCIs in a scenario of a plurality of activated BWPs is not considered. Consequently, service experience of the terminal device is poor.

SUMMARY

Embodiments of this application provide a method for detecting downlink control information, a terminal device, and a network device, to resolve a problem in the prior art that service experience is poor because blind detection of DCIs in a scenario of a plurality of activated BWPs is not considered.

According to a first aspect, a method for detecting downlink control information is provided, including: receiving, by a terminal device from a network device, detection related information for detecting downlink control information DCIs of all bandwidth parts BWPs, where the detection related information is determined by the network device based on resource load of control resource sets of all the BWPs; and detecting, by the terminal device, each of the DCIs based on the detection related information. Therefore, when determining that the terminal device needs to activate a plurality of BWPs, the network device may configure, for the terminal device based on a use status of CORESET resources of the activated BWPs, appropriate detection related information for detecting the downlink control information, thereby improving service experience of the UE, improving efficiency of using the CORESET resources in the control resource sets, and reducing blind detection performed by the terminal device on the downlink control information.

In a possible design, the detection related information includes at least one of information about a control resource set, an aggregation level set, a scale factor, and a detection period that are required for detecting each of the DCIs; and the information about a control resource set includes at least one of a frequency domain resource of the control resource set, a start orthogonal frequency division multiplexing OFDM symbol, duration, and a detection period. Therefore, when receiving the detection related information of the DCIs of all the BWPs, the UE may obtain, by calculating the detection related information, the resources occupied by the search spaces of the DCIs, to obtain, based on the resources, the DCIs carried on the PDCCH.

In a possible design, the detection related information further includes an identifier or index of a first BWP in all the BWPs, and the identifier or index of the first BWP is used to indicate that DCIs of all the BWPs are on resources of a control resource set of the first BWP. In this way, when load of control resource sets of all the BWPs is relatively slight, if transmission resources of DCIs of a plurality of BWPs are on a control resource set of a same BWP, efficiency of using the control resource set may be improved, and a power saving effect may be achieved for the terminal device.

In a possible design, the detection related information further includes first indication information, which is used to indicate that transmission resources of the DCIs of all the BWPs are on resources of a same control resource set of a same BWP, and search spaces of the DCIs of all the BWPs are the same or different. In this way, when the search spaces of the DCIs of all the BWPs are the same, the search spaces of the DCIs may be reduced, and efficiency of using resources may be improved.

In a possible design, the detection related information further includes second indication information, where the second indication information is used to indicate that transmission resources of the DCIs of all the BWPs are sent on resources of the control resource sets of respective BWPs, and the second indication information includes an identifier or index of a first detected BWP in all the BWPs. In this way, the terminal device may detect a DCI of a first detected BWP based on an identifier or index of the first detected BWP, so that subsequent DCIs may be detected based on information about the first detected DCI, to reduce blind detection performed by the terminal device on the DCIs and improve service experience of the terminal device.

In a possible design, the detecting, by the terminal device, each of the DCIs based on the detection related information includes: if the terminal device determines that the control resource sets of the DCIs of all the BWPs are different, first detecting, by the terminal device based on the detection related information, a DCI of a BWP that is indicated by the identifier or index of the first detected BWP in all the BWPs, or first detecting, by the terminal device, a DCI of a primary BWP in all the BWPs. In this way, the terminal device may detect a DCI of a first detected BWP based on an identifier or index of the first detected BWP or the primary BWP, so that subsequent DCIs may be detected based on information about the first detected DCI, to reduce blind detection performed by the terminal device on the DCIs and improve service experience of the terminal device.

In a possible design, the detecting, by the terminal device, each of the DCIs based on the detection related information includes: if the terminal device determines that the control resource sets of the DCIs of all the BWPs are different, or the control resource sets of the DCIs of all the BWPs are the same and search spaces of the DCIs of all the BWPs are the same, obtaining, by the terminal device based on the detection related information and according to the following formula 1, a control channel element CCE occupied by any candidate physical downlink control channel PDCCH of the search spaces of the DCIs of all the BWPs, where the formula 1 includes: $L\{(Y_k+m')\bmod \lfloor N_{CCE,k}/L \rfloor\}+i, m'=m$, where L represents a size of an aggregation level, $N_{CCE,k}$ represents a quantity of CCEs in a control area included in a detection occasion k, i=0, ..., L−1, m=0, ..., $M^{(L)}$−1, $M^{(L)}$ represents a quantity of candidate PDCCHs that need to be monitored in the search spaces, $Y_k=(A \cdot Y_{k-1}) \bmod D$, $Y_{-1}=n_{RNTI}\neq 0$, A=39827, D=65537, k=$\lfloor n_s/2 \rfloor$, and $n_s$ represents a slot number in a system frame. To be specific, if the terminal device determines that control resource sets of the DCIs of all the BWPs are different, or control resource sets of the DCIs of all the BWPs are the same and search spaces of the DCIs of all the BWPs are the same, the terminal device calculates, according to a conventional detection mechanism, CCEs occupied by a candidate PDCCH m of search spaces of the DCIs of all the BWPs.

In a possible design, the detecting, by the terminal device, each of the DCIs based on the detection related information includes: if the terminal device determines that the control resource sets of the DCIs of all the BWPs are the same and search spaces of the DCIs of all the BWPs are different, obtaining, by the terminal device based on the detection related information and according to the following formula 2, a control channel element CCE occupied by any candidate physical downlink control channel PDCCH of the search spaces of the DCIs of all the BWPs, where the formula 2 includes: $L\{(Y_k+m') \bmod \lfloor N_{CCE,k}/L \rfloor\}+i, m'=m+M^{(L)} \cdot n_{CBI}$, where L represents a size of an aggregation level, $N_{CCE,k}$ represents a quantity of CCEs in a control area included in a detection occasion k, i=0, ..., L−1, m=0, ..., $M^{(L)}$−1, $M^{(L)}$ represents a quantity of candidate PDCCHs that need to be monitored in the search spaces, $Y_k=(A \cdot Y_{k-1}) \bmod D$, $Y_{-1}=n_{RNTI}\neq 0$, A=39827, D=65537, k=$\lfloor n_s/2 \rfloor$, $n_s$ represents a slot number in a system frame, and $n_{CBI}$ represents a parameter obtained based on a carrier index and a BWP index. To be specific, if the terminal device determines that control resource sets of the DCIs of all the BWPs are the same and search spaces of the DCIs of all the BWPs are different, the terminal device calculates, by using a cross-BWP detection mechanism, CCEs occupied by a candidate PDCCH m of each search space.

In a possible design, the detecting, by the terminal device, each of the DCIs based on the detection related information includes: after detecting a first DCI in the DCIs of all the BWPs based on the detection related information, detecting, by the terminal device based on the first DCI, another DCI except the first DCI. In this way, the terminal device may detect subsequent DCIs based on the information about the first DCI, to reduce blind detection performed by the terminal device on the DCIs and improve service experience of the terminal device.

In a possible design, the first DCI includes a carrier identifier or index of a BWP of the first DCI, and an identifier or index of a BWP of the first DCI; or the first DCI includes an identifier or index of a BWP of the first DCI. In this way, the terminal device may detect subsequent DCIs of the BWPs based on the carrier identifier or index of the BWP of the first detected DCI or the identifier or index of the BWP of the first detected DCI, to reduce blind detection performed by the terminal device on the DCIs and improve service experience of the terminal device.

In a possible design, the first DCI includes at least one of a total quantity of the DCIs of all the BWPs, third indication information, and fourth indication information, where the third indication information is used to indicate that bit sizes of the DCIs of all the BWPs are the same or different, and the fourth indication information is used to indicate that formats of the DCIs of all the BWPs are the same or different. In this way, when each BWP sends its own DCI in its own control resource set, a quantity of blind detection times of the terminal device may be reduced and air interface overheads may be reduced. In other words, a BWP to be first detected by the terminal device may be determined.

In a possible design, the detecting, by the terminal device based on the first DCI, another DCI except the first DCI includes: if the terminal device determines, based on the first DCI, that bit sizes of the DCIs of all the BWPs are the same, blindly detecting, by the terminal device, the another DCI based on the bit size of the first DCI. In this way, a quantity of blind detection times of the terminal device is reduced.

In a possible design, the detecting, by the terminal device based on the first DCL another DCI except the first DCI includes: if the terminal device determines, based on the first DCI, that the formats of the DCIs of all the BWPs are the same, blindly detecting, by the terminal device, the another DCI based on the format of the first DCI. In this way, a quantity of blind detection times of the terminal device is reduced.

In a possible design, the detecting, by the terminal device based on the first DCI, another DCI except the first DCI includes: if the terminal device determines the total quantity of the DCIs of all the BWPs based on the first DCI, quitting, by the terminal device, current detection after completing blind detection of the total quantity of the DCIs. In this way, a quantity of blind detection times of the terminal device is reduced.

According to a second aspect, a method for detecting downlink control information is provided, including: determining, by a network device based on load of control resource sets of all bandwidth parts BWPs, detection related information for detecting, by a terminal device, downlink control information DCIs of all the BWPs; and sending, by the network device, the detection related information to the terminal device. Therefore, when determining that the terminal device needs to activate a plurality of BWPs, the network device may configure, for the terminal device based on a use status of CORESET resources of the activated BWPs, appropriate detection related information for detecting the downlink control information, thereby improving service experience of the UE, improving efficiency of using the CORESET resources in the control resource sets, and reducing blind detection performed by the terminal device on the downlink control information.

In a possible design, the determining, by a network device based on load of the control resource sets of all bandwidth parts BWPs, detection related information for detecting, by a terminal device, downlink control information DCIs of all the BWPs includes: determining, by the network device based on quantities, sizes, and usage of the control resource sets of all the bandwidth parts BWPs, the detection related information for detecting, by the terminal device, the DCIs of all the BWPs. In this way, efficiency of using the control resource set is improved.

In a possible design, the detection related information includes at least one of information about a control resource set, an aggregation level set, a scale factor, and a detection period that are required for detecting each of the DCIs; and the information about a control resource set includes at least one of a frequency domain resource of the control resource set, a start orthogonal frequency division multiplexing OFDM symbol, duration, and a detection period. Therefore, when receiving the detection related information of the DCIs of all the BWPs, the UE may obtain, by calculating the detection related information, the resources occupied by the search spaces of the DCIs, to obtain, based on the resources, the DCIs carried on the PDCCH.

In a possible design, the detection related information further includes an identifier or index of a first BWP in all the BWPs, and the identifier or index of the first BWP is used to indicate that the DCIs of all the BWPs are on resources of a control resource set of the first BWP; the detection related information further includes first indication information, which is used to indicate that transmission resources of the DCIs of all the BWPs are on resources of a same control resource set of a same BWP, and search spaces of the DCIs of all the BWPs are the same or different; and the detection related information further includes second indication information, where the second indication information is used to indicate that transmission resources of the DCIs of all the BWPs are sent on resources of the control resource sets of respective BWPs, and the second indication information includes an identifier or index of a first detected BWP in all the BWPs. In this way, efficiency of using the control resource set may be improved, and a power saving effect may be achieved for the terminal device.

In a possible design, the sending, by the network side device, the detection related information to the terminal device includes: sending, by the network device, the detection related information to the terminal device by using radio resource control RRC signaling; sending, by the network device, the detection related information to the terminal device by using a medium access control control element MAC CE; sending, by the network device, the detection related information to the terminal device by using physical layer signaling; or sending, by the network device, the detection related information to the terminal device by using signaling for activating a BWP.

According to a third aspect, a terminal device is provided, including: a transceiver unit, configured to receive, from a network device, detection related information for detecting downlink control information DCIs of all bandwidth parts BWPs, where the detection related information is determined by the network device based on resource load of the control resource sets of all the BWPs; and a processing unit, configured to detect each of the DCIs based on the detection related information.

In a possible design, the detection related information includes at least one of information about a control resource set, an aggregation level set, a scale factor, and a detection period that are required for detecting each of the DCIs; and the information about a control resource set includes at least one of a frequency domain resource of the control resource set, a start orthogonal frequency division multiplexing OFDM symbol, duration, and a detection period.

In a possible design, the detection related information further includes an identifier or index of a first BWP in all the BWPs, and the identifier or index of the first BWP is used to indicate that the DCIs of all the BWPs are on resources of a control resource set of the first BWP.

In a possible design, the detection related information further includes first indication information, which is used to indicate that transmission resources of the DCIs of all the BWPs are on resources of a same control resource set of a same BWP, and search spaces of the DCIs of all the BWPs are the same or different.

In a possible design, the detection related information further includes second indication information, where the second indication information is used to indicate that transmission resources of the DCIs of all the BWPs are sent on resources of the control resource sets of respective BWPs. and the second indication information includes an identifier or index of a first detected BWP in all the BWPs.

In a possible design, the processing unit is configured to: if it is determined that the control resource sets of the DCIs of all the BWPs are different, first detect, based on the detection related information, a DCI of a BWP that is indicated by the identifier or index of the first detected BWP in all the BWPs, or first detect, by a terminal device, a DCI of a primary BWP in all the BWPs.

In a possible design, the processing unit is configured to: if it is determined that the control resource sets of the DCIs of all the BWPs are different, or the control resource sets of the DCIs of all the BWPs are the same and search spaces of the DCIs of all the BWPs are the same, obtain, based on the detection related information and according to the following formula 1, a control channel element CCE occupied by any candidate physical downlink control channel PDCCH of the search spaces of the DCIs of all the BWPs, where the formula 1 includes: $L\{(Y_k+m')\bmod \lfloor N_{CCE,k}/L\rfloor\}+i, m'=m$, where L represents a size of an aggregation level, $N_{CCE,k}$ represents a quantity of CCEs in a control area included in a detection occasion k, $i=0, \ldots, L-1, m=0, \ldots, M^{(L)}-1$, $M^{(L)}$ represents a quantity of candidate PDCCHs that need to be monitored in the search spaces, $Y_k=(A \cdot Y_{k-1}) \bmod D$, $Y_{-1}=n_{RNTI}\neq 0$, $A=39827$, $D=65537$, $k=\lfloor n_s/2 \rfloor$, and $n_s$ represents a slot number in a system frame.

In a possible design, the processing unit is configured to: if the terminal device determines that the control resource sets of the DCIs of all the BWPs are the same and search spaces of the DCIs of all the BWPs are different, obtain, by the terminal device based on the detection related information and according to the following formula 2, a control channel element CCE occupied by any candidate physical downlink control channel PDCCH of the search spaces of the DCIs of all the BWPs, where the formula 2 includes: $L\{(Y_k+m') \bmod \lfloor N_{CCE,k}/L \rfloor\}+i, m'=m+M^{(L)} \cdot n_{CBI}$, where L represents a size of an aggregation level, $N_{CCE,k}$ represents a quantity of CCEs in a control area included in a detection occasion k, $i=0, \ldots, L-1, m=0, \ldots, M^{(L)}-1$, $M^{(L)}$ represents a quantity of candidate PDCCHs that need to be monitored in the search spaces, $Y_k=(A \cdot Y_{k-1}) \bmod D$, $Y_{-1}=n_{RNTI}\neq 0$, $A=39827$, $D=65537$, $k=\lfloor n_s/2 \rfloor$, $n_s$ represents a slot number in a system frame, and $n_{CBI}$ represents a parameter obtained based on a carrier index and a BWP index.

In a possible design, the processing unit is configured to: after a first DCI in the DCIs of all the BWPs is detected based on the detection related information, detect another DCI except the first DCI based on the first DCI.

In a possible design, the first DCI includes a carrier identifier or index of a BWP of the first DCI, and an identifier or index of a BWP of the first DCI; or the first DCI includes an identifier or index of a BWP of the first DCI.

In a possible design, the first DCI includes at least one of a total quantity of the DCIs of all the BWPs, third indication information, and fourth indication information, there the third indication information is used to indicate that bit sizes of the DCIs of all the BWPs are the same or different, and the fourth indication information is used to indicate that formats of the DCIs of all the BWPs are the same or different.

In a possible design, the processing unit is configured to: if the terminal device determines, based on the first DCI, that bit sizes of the DCIs of all the BWPs are the same, blindly detect the another DCI based on the bit size of the first DCI.

In a possible design, the processing unit is configured to: if the terminal device determines, based on the first DCI, that the formats of the DCIs of all the BWPs are the same, blindly detect the another DCI based on the format of the first DCI.

In a possible design, the processing unit is configured to: if the terminal device determines the total quantity of the DCIs of all the BWPs based on a DCI of a first detected BWP, quit current detection after completing blind detection of the total quantity of the DCIs.

According to a fourth aspect, a network device is provided, including: a processing unit, configured to determine, based on load of control resource sets of all bandwidth parts BWPs, detection related information for detecting, by a terminal device, downlink control information DCIs of all the BWPs; and a transceiver unit, configured to send the detection related information to the terminal device.

In a possible design, the processing unit is configured to determine, based on quantities, sizes, and usage of the control resource sets of all the bandwidth parts BWPs, the detection related information for detecting, by the terminal device, the DCIs of all the BWPs.

In a possible design, the detection related information includes at least one of information about a control resource set, an aggregation level set, a scale factor, and a detection period that are required for detecting each of the DCIs; and the information about a control resource set includes at least one of a frequency domain resource of the control resource set, a start orthogonal frequency division multiplexing OFDM symbol, duration, and a detection period.

In a possible design, the detection related information further includes an identifier or index of a first BWP in all the BWPs, and the identifier or index of the first BWP is used to indicate that the DCIs of all the BWPs are on resources of a control resource set of the first BWP; the detection related information further includes first indication information, which is used to indicate that transmission resources of the DCIs of all the BWPs are on resources of a same control resource set of a same BWP, and search spaces of the DCIs of all the BWPs are the same or different; and the detection related information further includes second indication information, where the second indication information is used to indicate that transmission resources of the DCIs of all the BWPs are sent on resources of the control resource sets of respective BWPs, and the second indication information includes an identifier or index of a first detected BWP in all the BWPs.

In a possible design, the transceiver unit is configured to: send the detection related information to the terminal device by using radio resource control RRC signaling; send the detection related information to the terminal device by using a medium access control control element MAC CE; send the detection related information to the terminal device by using physical layer signaling; or send the detection related information to the terminal device by using signaling for activating a BWP.

According to still another aspect, an embodiment of this application provides a computer storage medium, configured to store a computer software instruction to be used by the foregoing network device and/or terminal device. The computer software instruction includes a program designed for executing the foregoing aspects.

According to still another aspect, an embodiment of this application provides a computer program product including an instruction. When the computer program product is run on a computer, the computer is enabled to perform the methods in the foregoing aspects.

According to still another aspect, an embodiment of this application provides a communications apparatus, comprising a memory, wherein the memory stores a computer instruction, and when the computer instruction is executed, the communications apparatus is enabled to perform the method according to any of the foregoing aspects.

According to still another aspect, an embodiment of this application provides a computer storage medium, wherein the computer storage medium stores a computer instruction, and when the computer instruction is executed by a computer, the computer is enabled to perform the method according to any of the foregoing aspects.

Therefore, in the DCI detection method provided in this application, sending resources of the DCIs of all the BWPs may be dynamically configured based on resource load of the control resource sets of all the BWPs, to implement flexible detection of a plurality of DCIs. In addition, a relationship between a plurality of DCIs may be used to effectively detect another DCI, to reduce a quantity of times for blind detection of the DCIs.

DESCRIPTION OF EMBODIMENTS

Figure 1:
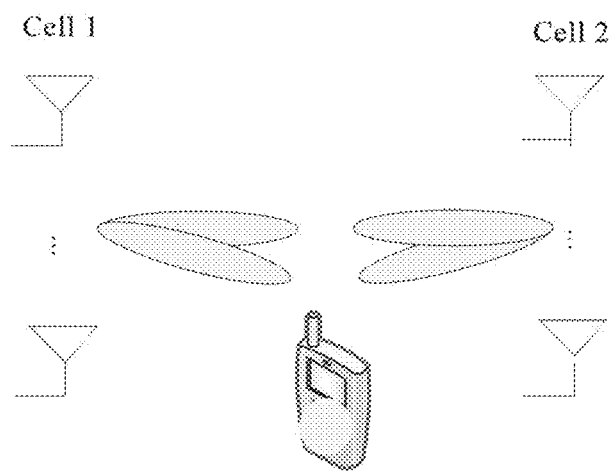
FIG. 1 is a schematic diagram of coordinated multi-point transmission in the prior art.
Figure 1A:
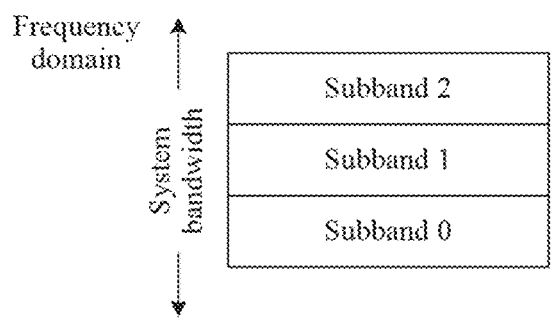
FIG. 1A is a schematic diagram of a BWP according to an embodiment of this application.

For ease of understanding, example descriptions of some concepts related to this application are provided for reference purposes. Details are as follows:

BWP: some frequency domain resources in a carrier bandwidth allocated by a base station to a terminal. A size of the BWP is less than or equal to a bandwidth capability of the terminal, namely, a maximum bandvwidth supported by the terminal. In addition, the BWP may be contiguous frequency domain resources. For example, the BWP may include a plurality of contiguous subcarriers. As shown in FIG. 1A, each subband (a subband 0, a subband 1, or a subband 2) may be one BWP. For another example, the BWP may include a plurality of contiguous physical resource blocks (physical resource block, PRB). The terminal can support a plurality of BWPs; in other words, the base station can configure a plurality of BWPs for the terminal. When a plurality of BWPs are configured, the BWPs may overlap or may not overlap. In a downlink, the UE can configure one or more BWPs, and may activate a downlink BWP at a specified time. Except the activated BWP, the UE does not receive a PDSCH or PDCCH of an inactivated BWP. In an uplink, the UE can also configure one or more BWPs, and may activate an uplink BWP at a specified time. Except the activated BWP, the UE does not receive a physical uplink shared channel (Physical Uplink Shared Channel, PUSCH) or a physical uplink control channel (Physical Uplink Control CHannel, PUCCH) of an inactivated BWP.

Subframe: In LTE, each subframe is 14/12 orthogonal frequency division multiplexing (Orthogonal Frequency Division A plurality of, OFDM) symbols, and the first 1-4 symbols are used for sending a control channel.

Search space: To implement flexible scheduling between users, each user is allocated with a control channel search space. The user needs to blindly detect, according to a predetermined rule, whether there is a control channel of the user in the search space. Therefore, the search space may include an aggregation level, a quantity of candidate PDCCHs (PDCCH candidate) at each aggregation level, and a common search space and a user-specific search space.

Aggregation level: includes four levels in total, corresponding to values of 1/2/4/8, which indicate a quantity of control channel elements (Control Channel Element, CCE) that may be occupied by a PDCCH of the user. The CCE is a basic unit of a control channel physical resource, each CCE includes nine resource element groups (Resource Element Group, REG), and each REG includes four available resource elements (Resource-Element. RE).

Quantity of candidate PDCCHs at each aggregation level: To increase scheduling flexibility and avoid blocking (blocking), LTE specifies that each user needs to blindly detect a plurality of candidate PDCCHs at each aggregation level.

Common search space and user-specific search space: The common search space is mainly used to send a PDCCH corresponding to common information such as a broadcast channel (broadcast channel, BCH) and a paging channel (Paging Channel, PCH). Because the common search space is oriented to all users in a cell, aggregation levels include only 4 and 8 (a long aggregation level means more physical resources and a low bit rate, and a PDCCH can be received by all users in the cell). The user-specific search space is mainly used to send a PDCCH corresponding to user-specific data, and aggregation levels include 1/2/4/8. The base station may select a proper aggregation level and a corresponding candidate PDCCH based on a plurality of factors such as downlink physical channel quality of the user and a quantity of users scheduled in a current subframe, to schedule the user. The common search space and the user-specific search space may overlap.

Scale factor: In long term evolution advanced (Long Term Evolution Advanced, LTE-A) R13, for each subframe and each aggregation level, a scale factor a of a quantity of candidate locations may be configured for each carrier. For example, if a scale factor a configured for the aggregation level 1 is 0.33, the terminal device only needs to attempt to perform blind detection on the aggregation level 1 for 0.33*6=2 times, and does not need to perform blind detection on the aggregation level 1 for 6 times.

The embodiments of this application may be applied to a wireless communications system, including but not limited to 3rd Generation Partnership Project (3rd Generation Partnership Project, 3GPP) NR and a subsequent wireless communications system, and may be specifically applied to a scenario in which DCIs of a plurality of BWPs are detected.

Figure 2:
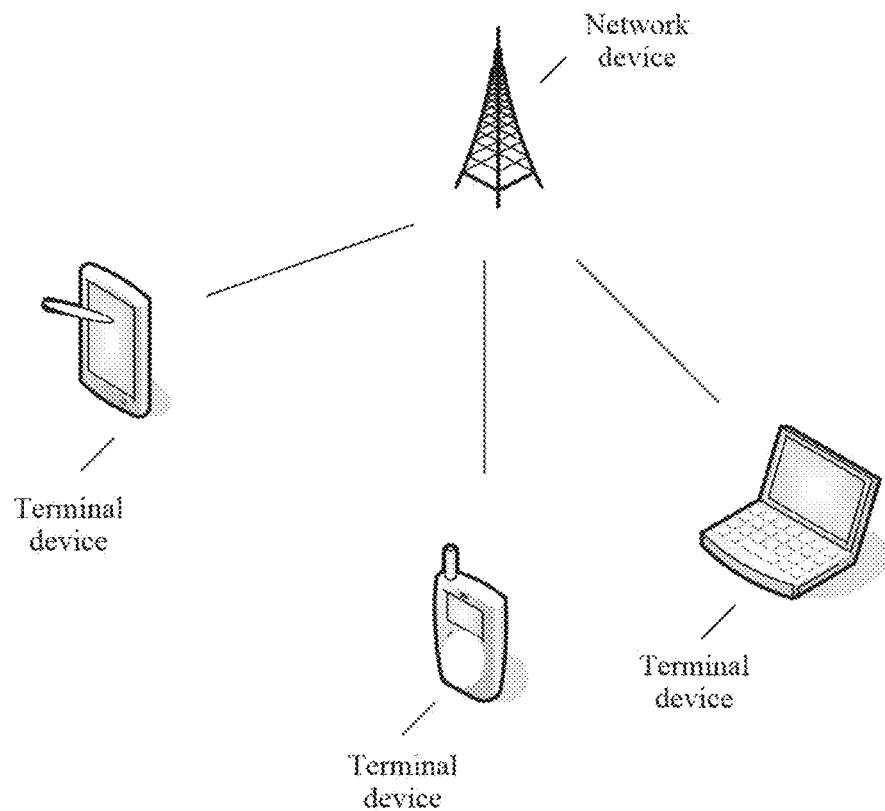
FIG. 2 is a schematic diagram of a network architecture according to an embodiment of this application.

As shown in FIG. 2, a network architecture in the embodiments of this application may include a network device and a terminal device.

The network device may be a base station (Base Station, BS) device, which may also be referred to as a base station, and is an apparatus that is deployed in a radio access network to provide a wireless communication function. For example, in a 2G network, devices that provide a base station function include a base transceiver station (Base Transceiver Station, BTS) and a base station controller (Base Station Controller, BSC). In a 3G network, devices that provide a base station function include a NodeB (NodeB) and a radio network controller (Radio Network Controller, RNC). In a 4G network, devices that provide a base station function include an evolved NodeB (evolved NodeB, eNB). In a wireless local area network (Wireless 1. Local Area Networks. WLAN), a device that provides a base station function is an access point (Access Point, AP). In a 5G communications system, devices that provide a base station function include an eNB, a new radio NodeB (New Radio NodeB, gNB), a centralized unit (Centralized Unit, CU), a distributed unit (Distributed Unit), a new radio controller, and the like.

The terminal device may be, for example, user equipment (user equipment, UE), may be a removable terminal device, or may be an irremovable terminal device. The device is mainly configured to receive or send service data. User equipment may be distributed in the network. The user equipment has different names in different networks, for example, a terminal, a mobile station, a subscriber unit, a station, a cellular phone, a personal digital assistant, a wireless modem, a wireless communications device, a handheld device, a laptop computer, a cordless phone, and a wireless local loop station. The user equipment may communicate with one or more core networks through a radio access network (radio access network, RAN) (an access part of a wireless communications network), for example, exchange voice and/or data with the radio access network.

Figure 3:
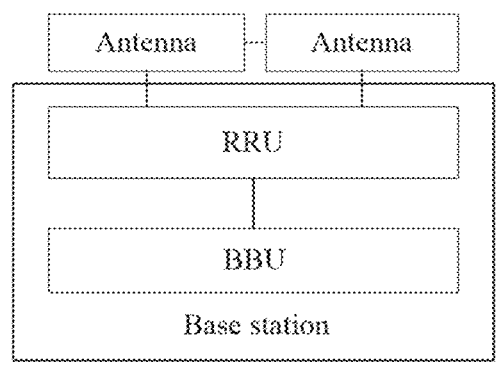
FIG. 3 is a schematic structural diagram of a base station according to an embodiment of this application.

In an example, a base station 100 may be implemented by using a structure shown in FIG. 3. FIG. 3 shows a universal hardware architecture of a base station. The base station shown in FIG. 3 may include a building baseband unit (building baseband unit, BBU) and a remote radio unit (remote radio unit, RRU). The RRU is connected to an antenna system (namely, an antenna). The BBU and the RRU may be separately used as needed. It should be noted that in a specific implementation process, the base station 100 may also use another universal hardware architecture, and is not limited only to the universal hardware architecture shown in FIG. 3.

Figure 4:
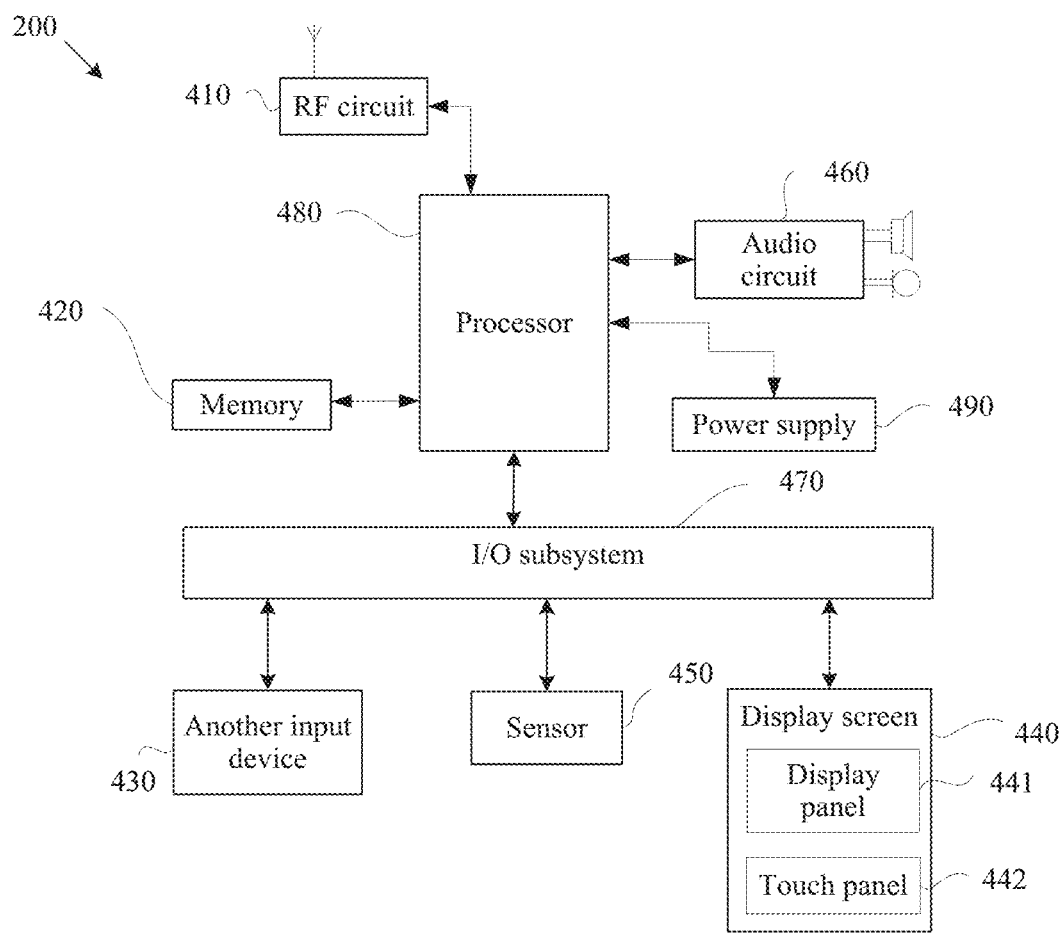
FIG. 4 is a schematic structural diagram of a terminal device, which is a mobile phone, according to an embodiment of this application.

In an example, a terminal device 200 may be implemented by using a structure shown in FIG. 4. For example, the terminal device 200 is a mobile phone, and FIG. 4 shows a universal hardware architecture of the mobile phone for description purpose. The mobile phone shown in FIG. 4 may include components such as a radio frequency (radio Frequency, RF) circuit 410, a memory 420, another input device 430, a display screen 440, a sensor 450, an audio circuit 460, an I/O subsystem 470, a processor 480, and a power supply 490. A person skilled in the art may understand that, a mobile phone structure shown in FIG. 4 does not constitute any limitation on the mobile phone, and the mobile phone may include more or fewer components than those shown in the figure, or some components may be combined, or some components may be split, or different component arrangements may be used. A person skilled in the art may understand that, the display screen 440 is a user interface (user Interface, UI), and the display screen 440 may include a display panel 441 and a touch panel 442. In addition, the mobile phone may include more or fewer components than those shown in the figure. Although not shown, the mobile phone may further include a functional module or device such as a camera or a Bluetooth module. Details are not described herein.

Further, the processor 480 is separately connected to the RF circuit 410, the memory 420, the audio circuit 460, the I/O subsystem 470, and the power supply 490. The I/O subsystem 470 is separately connected to the another input device 430, the display screen 440, and the sensor 450. The RF circuit 410 may be configured to receive and send signals in an information receiving and sending process or in a call process. Particularly, after receiving downlink information of the base station, the RF circuit 410 sends the downlink information to the processor 480 for processing. The memory 420 may be configured to store a software program and module. The processor 480 performs various functional applications of the mobile phone and data processing by running the software program and module stored in the memory 420. The another input device 430 may be configured to receive input digit or character information, and generate a key signal input related to a user setting and function control of the mobile phone. The display screen 440 may be configured to display information entered by the user or information provided for the user, and various menus of the mobile phone, and may further receive user input. The sensor 450 may be an optical sensor, a motion sensor, or another sensor. The audio circuit 160 may provide an audio interface between the user and the mobile phone. The I/O subsystem 470 is configured to control external devices for input and output, and the external devices may include another device input controller, a sensor controller, and a display controller. The processor 480 is a control center of the mobile phone 400. The processor 480 connects all parts of the entire mobile phone by using various interfaces and lines, and performs various functions of the mobile phone 400 and processes data by running or executing the software program and/or module stored in the memory 420 and by invoking data stored in the memory 420, thereby performing overall monitoring on the mobile phone. The power supply 490 (such as a battery) is configured to supply power to the foregoing components. Preferably, the power supply may be logically connected to the processor 480 by using a power supply management system, thereby implementing functions such as charging management, discharging management, and power consumption management by using the power supply management system.

In the method for detecting downlink control information provided in this application, sending resources of the PDCCHs of all the BWPs may be dynamically configured based on load of control resource sets (Control resource set, CORESET) of all the BWPs, to implement flexible detection of DCIs of a plurality of BWPs. CORESET is a resource used to transmit a DCI.

Figure 5:
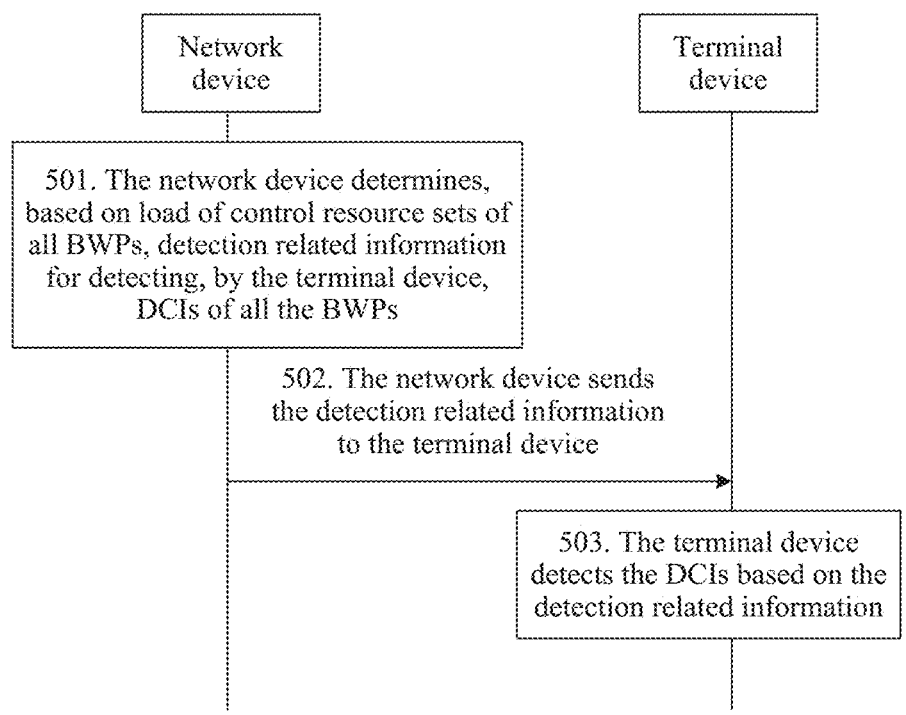
FIG. 5 is a schematic flowchart of detecting downlink control information according to an embodiment of this application.

An embodiment of this application provides a method for detecting downlink control information. As shown in FIG. 5, the method includes the following steps.

501. A network device determines, based on load of control resource sets of all BWPs, detection related information for detecting, by a terminal device, DCIs of all the BWPs.

There may be a plurality of BWPs activated by the network device. A plurality of activated BWPs used by each terminal device may be different, and quantities, sizes, and use statuses of CORESETs of all activated BWPs may also be different. In this way, the network device needs to consider how a DCI of a BWP used by each terminal device is transmitted. For example, when CORESET load of an activated BWP is greater than a preset threshold 1, the DCI of the activated BWP needs to be transmitted on another activated BWP. For example, when the base station configures, for each UE, detection related information for detecting DCIs of a plurality of activated BWPs, transmission resources of DCIs of a plurality of BWPs may be on resources of a CORESET of a same BWP, or even on resources of a same CORESET of a same BWP. When the CORESET load of an activated BWP is relatively slight, transmission resources of DCIs of a plurality of BWPs may be on resources of CORESETs of respective BWPs.

502. The network device sends the detection related information to the terminal device; in other words, the terminal device receives the detection related information sent by the network device.

503. The terminal device detects each of the DCIs based on the detection related information.

In the method in this embodiment, when determining that the terminal device needs to activate a plurality of BWPs, the network device configures, for the terminal device based on a use status of CORESET resources of the activated BWPs, appropriate detection related information for detecting the downlink control information, thereby improving service experience of the terminal device, improving efficiency of using the CORESET resources, and reducing blind detection performed by the terminal device on the downlink control information.

The following further describes the embodiments of this application.

Figure 6:
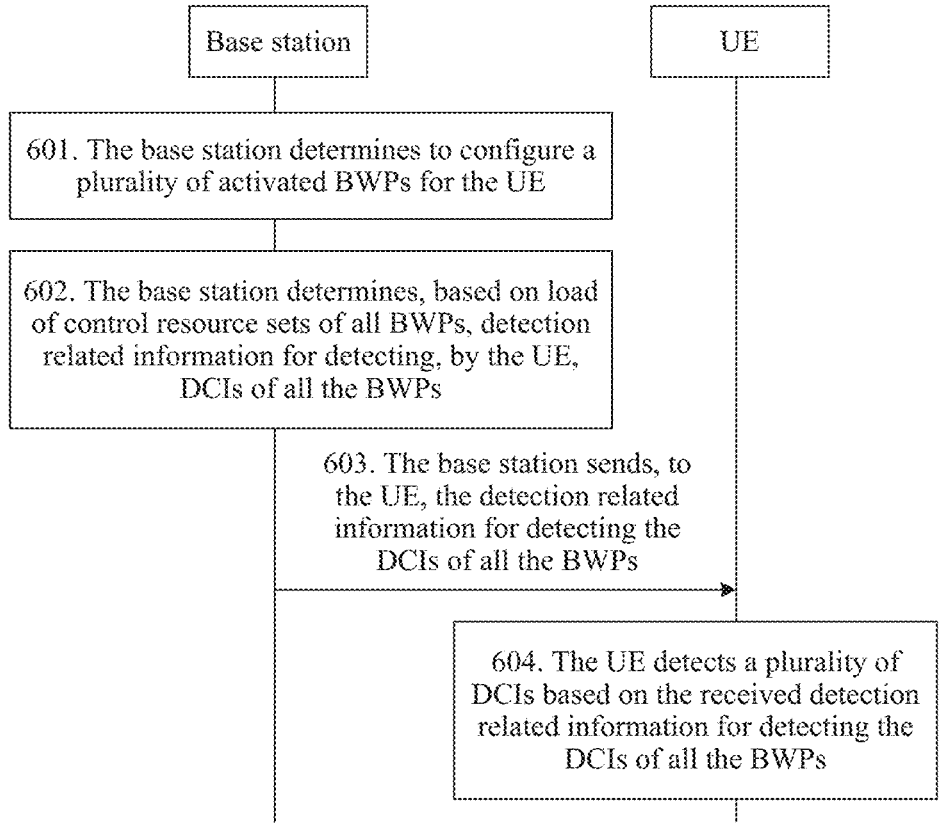
FIG. 6 is a schematic flowchart of detecting downlink control information according to an embodiment of this application.

An embodiment of this application provides a method for detecting downlink control information. As shown in FIG. 6, for example, a network device is a base station and a terminal device is UE. The method includes the following steps.

601. The base station determines to configure a plurality of activated BWPs for the UE.

When the UE requires a plurality of activated BWPs for data transmission, for example, when the UE needs to simultaneously perform a plurality of services of enhanced mobile broadband (Enhanced Mobile Broadband, eMBB), ultra-reliable and low latency communication (ultra-Reliable and Low Latency Communication, uRLLC), and massive machine type communication (massive Machine Type Communication, mMTC), the base station may determine to configure a plurality of activated BWPs for the UE. For example, the base station may determine, based on scheduling request (Scheduling Request, SR) information of a plurality of services initiated by the UE, whether a plurality of activated BWPs need to be configured for the UE.

602. The base station determines, based on load of control resource sets of all BWPs, detection related information for detecting, by the UE, DCIs of all the BWPs.

The detection related information may include at least one of information about a CORESET an aggregation level set, a scale factor, and a detection period that are required for detecting each of the DCIs. The information about a CORESET may include at least one of a frequency domain resource of the CORESET, a start orthogonal frequency division multiplexing (Orthogonal Frequency Division A plurality of, OFDM) symbol, duration, and a detection period.

It may be learned from step 501 that the base station needs to consider how a DCI of a BWP used by each UE is transmitted. When CORESET load of an activated BWP is greater than a preset threshold 1, the DCI of the activated BWP may be transmitted on another activated BWP. Therefore, the base station configures, for each UE, the detection related information for detecting the DCIs of the plurality of activated BWPs.

In a possible case, the detection related information may further include an identifier or index of a first BWP in all the BWPs, and the identifier or index of the first BWP is used to indicate that the DCIs of all the BWPs are on resources of a CORESET of the first BWP. To be specific, the base station may determine, based on a use status of resources of CORESETs of all the BWPs, that transmission resources of DCIs of a plurality of BWPs are on resources of a CORESET of a same BWP. The same BWP may be referred to as a primary (primary) BWP. In this case, the detection related information further includes an identifier or index of the primary BWP.

In a possible case, the detection related information may further include first indication information, which is used to indicate that transmission resources of the DCIs of all the BWPs are on resources of a same CORESET of a same BWP, and search spaces of the DCIs of all the BWPs are the same or different. To be specific, the base station may further determine whether transmission resources of DCIs of a plurality of BWPs are on a same CORESET of a same BWP. If the transmission resources of the DCIs of the plurality of BWPs are on a same CORESET, the base station may configure whether search spaces of a plurality of DCIs are the same or different. In this case, the detection related information may further include information indicating whether the search spaces of the plurality of DCIs are the same.

In a possible case, the detection related information may further include second indication information, where the second indication information is used to indicate that transmission resources of the DCIs of all the BWPs are sent on resources of the CORESETs of respective BWPs, and the second indication information includes an identifier or index of a first detected BWP in all the BWPs. To be specific, the base station may further determine that DCIs of a plurality of BWPs are sent on respective CORESETs, and may determine which BWP is to be detected by the UE, that is, the first BWP In this case, the detection related information further includes indication information of an identifier or index of the first BWP.

In this way, the base station may flexibly configure the transmission resources of the DCIs and dynamically adjust a detection parameter based on the use status of the CORESET resources, thereby improving efficiency of using the CORESET resources, improving DCI detection performance of the UE, and reducing blind detection performed by the UE on the downlink control information.

603. The base station sends, to the UE, the detection related information for detecting the DCIs of all the BWPs; in other words, the UE receives the detection related information, sent by the base station, for detecting the DCIs of all the BWPs.

The base station may send the detection related information to the UE by using radio resource control (Radio Resource Control, RRC) signaling.

Alternatively, the base station may send the detection related information to the UE by using a medium access control (Medium Access Control, MAC) control element (Control Element, CE).

Alternatively, the base station may send the detection related information to the UE by using physical layer signaling, for example, L1 signaling.

Alternatively, for the detection related information for detecting the DCIs of the plurality of activated BWPs, the base station may send the detection related information to the UE by using signaling for activating a BWP.

In this way, the base station may semi-statically or dynamically notify the UE of the detection related information for detecting the DCIs, and adaptively match an activation status of a BWP and a use status of a CORESET resource, so that load of the CORESET resources is balanced and blind detection performed by the UE on the DCIs is reduced.

604. The UE detects a plurality of DCIs based on the received detection related information for detecting the DCIs of all the BWPs.

If CORESETs of the DCIs of all the BWPs are different, the UE may first detect, based on the detection related information, a DCI of a BWP that is indicated by the identifier or index of the first detected BWP in all the BWPs, or the UE first detects a DCI of a primary BWP in all the BWPs. To be specific, the UE may first detect a DCI of a BWP indicated by the indication information of the identifier or index of the first BWP, or first detect the DCI of the primary BWP. During detection, the UE may obtain, based on the detection related information and according to the following formula 1, control channel elements CCEs occupied by any candidate PDCCH m in search spaces of the DCIs of all the BWPs. The formula 1 is a conventional detection mechanism, and the formula 1 includes: $L\{(Y_k+m') \bmod \lfloor N_{CCE,k}/L \rfloor\}+i, m'=m$, where L represents a size of an aggregation level, $N_{CCE,k}$ represents a quantity of CCEs in a control area included in a detection occasion k, $i=0, \ldots, L-1, m=0, \ldots, M^{(L)}-1$, $M^{(L)}$ represents a quantity of candidate PDCCHs that need to be monitored in the search spaces, $Y_k=(A \cdot Y_{k-1}) \bmod D$, $Y_{-1}=n_{RNTI} \neq 0$, $A=39827$, $D=65537$, $k=\lfloor n_s/2 \rfloor$, and $n_s$ represents a slot number in a system frame.

If the CORESETs of the DCIs of all the BWPs are the same and search spaces of the DCIs of all the BWPs are the same, the UE may use a conventional detection mechanism, that is, obtain, based on the detection related information and according to the following formula 1, control channel elements CCEs occupied by any candidate PDCCH m of the search spaces of the DCIs of all the BWPs.

If the CORESETs of the DCIs of all the BWPs are the same and search spaces of the DCIs of all the BWPs are different, the UE may calculate, by using a cross-BWP detection mechanism, CCEs occupied by a candidate PDCCH m of each search space. For example, the UE may obtain, based on the detection related information and according to the following formula 2, CCEs occupied by any candidate PDCCH of the search spaces of the DCIs of all the BWPs. The formula 2 includes: $L\{(Y_k+m') \bmod \lfloor N_{CCE,k}/L \rfloor\}+i, m'=m+M^{(L)} \cdot n_{CBI}$, where L represents a size of an aggregation level, $N_{CCE,k}$ represents a quantity of CCEs in a control area included in a detection occasion k, $i=0, \ldots, L-1, m=0, \ldots, M^{(L)}-1$, $M^{(L)}$ represents a quantity of candidate PDCCHs that need to be monitored in the search spaces, $Y_k=(A \cdot Y_{k-1}) \bmod D$, $Y_{-1}=n_{RNTI} \neq 0$, $A=39827$, $D=65537$, $k=\lfloor n_s/2 \rfloor$, $n_s$ represents a slot number in a system frame, and $n_{CBI}$ represents a parameter obtained based on a carrier index $n_{CI}$ and a BWP index $n_{BI}$. For example, the parameter may be a product of the carrier index and the BWP index, that is, $n_{CBI}=n_{CI} \cdot n_{BI}$. A meaning of m' is the same as that of m, and a value of m' is offset relative to m.

In this embodiment, the base station may determine, based on a service requirement of the UE, whether the UE needs to activate a plurality of BWPs. When a plurality of BWPs need to be activated, the base station configures, for the UE based on a use status of CORESETs of the BWPs, appropriate detection related information for detecting DCIs. In this way, service experience of the UE may be improved, resource usage of the CORESETs may be improved, and blind detection performed by the UE on the DCIs is reduced.

In another embodiment of this application, the detection related information of the DCIs of the plurality of BWPs determined by the base station in the foregoing step 602 may further include transmission configuration information of the DCIs of the plurality of BWPs. In other words, the transmission configuration information of the DCIs of the BWPs is a part of the detection related information. The following describes the transmission configuration information.

When the base station activates a plurality of BWPs for the UE, the base station may configure a BWP for the UE based on a use status such as load of CORESET resources of all activated BWPs. BWPs may be classified into three types:

(1) a BWP that needs to carry a DCI of another BWP, and whose DCI does not need to be carried by another BWP; this type of BWP may be referred to as a primary BWP;

(2) a BWP whose DCI needs to be carried by another BWP; this type of BWP may be referred to as a secondary (secondary) BWP; and (3) a BWP whose DCI does not need to be carried by another BWP; this type of BWP may be referred to as a regular (regular) BWP.

If a plurality of activated BWPs are on different carriers, the transmission configuration information of the DCIs of the BWPs includes at least one of a "primary BWP indication (primary BWP indication)" field and a "primary-CB indication (primary carrier indication)" field. If the "primary BWP indication" is TRUE, it indicates that this BWP is the primary BWP, and a PDCCH sent by this BWP carries a CBIF field of this BWP. If the "primary BWP indication" is FALSE, this BWP is not the primary BWP and does not need to carry a DCI of another BWP, and the PDCCH sent by this BWP does not carry a CBIF field of this BWP. The "primary-CB indication" indicates a specific BWP of a specific carrier on which a DCI of this BWP needs to be carried. Specific content of the "primary-CB indication" is the same as that of the CBIF.

It can be learned that the transmission configuration information of the DCI of the primary BWP includes the CBIF. The CBIF includes a carrier indication and a bandwidth part indication. The carrier indication indicates a carrier identifier or index of the primary BWP, and the bandwidth part indication indicates an identifier or index of the primary BWP. If the primary BWP is a first detected BWP, and when a plurality of BWPs are on different carriers, transmission configuration information of a first detected DCI includes a carrier identifier or index of a BWP of the first DCI, and an identifier or index of the BWP of the first DCI.

The carrier indication and the bandwidth part indication may be specific identifiers or indices (index) or offsets (offset) for the primary carrier and the bandwidth part. The carrier index and the BWP index may be connected in series. For example, three bits are used to represent the carrier index, and another three bits are used to represent the BWP index, which may respectively represent eight carriers and eight BWPs. For example, 000001 represents a first BWP of a $0^{th}$ carrier. Similarly, the carrier offset and the BWP offset may be connected in series. For example, three bits are used to represent the carrier offset, and another three bits are used to represent the BWP offset, which may respectively represent eight carriers and eight BWPs. When the primary carrier is a second carrier, 001001 represents a third BWP of a third carrier. Optionally, the CBIF field may be divided into two fields: a CIF and a BIF, which respectively correspond to the carrier indication and the bandwidth part indication.

If a plurality of activated BWPs are on a same carrier, in the transmission configuration information of the DCIs of the BWPs, if the primary BWP is a first detected BWP, and when a plurality of BWPs are on a same carrier, transmission configuration information of a DCI of the first detected BWP includes an identifier or index of the first detected BWP, and no carrier identifier or index is required.

Therefore, in this embodiment, in a case of a plurality of activated BWPs, the primary BWP may be configured based on a status of CORESET resources of all BWPs to carry a DCI of another activated BWP. To be specific, after the first DCI in the DCIs of all the BWPs is detected based on the detection related information, another DCI except the first DCI is detected based on the first DCI, thereby improving efficiency of using the CORESET resources.

In still another embodiment of this application, for the detection related information of the DCIs of a plurality of BWPs determined by the base station in the foregoing step 602, if all the BWPs are regular BWPs, that is, each BWP sends its DCI in its CORESET, a quantity of blind detection times of the UE is multiplied. To reduce blind detection performed by the UE and reduce air interface overheads, the base station may determine a relationship between a plurality of DCIs to be detected by the UE this time. For example, the base station may determine a BWP to be first detected by the UE. Therefore, the detection related information may carry a first BWP field for configuring a BWP to be first detected by the UE. For example, when a value of the first BWP field is 1, it indicates that this BWP is the first BWP and the UE first detects this BWP. When a value of the first BWP field is 0, the UE does not first detect this BWP. The DCI of the first BWP, that is, the DCI of the first detected BWP may carry some indication information to indicate how subsequent DCIs are detected. In this way, blind detection performed by the UE and air interface overheads may be reduced. For example, the DCI of the first BWP, that is, the first detected DCI includes at least one of a total quantity of the DCIs of all the BWPs, third indication information, and fourth indication information, where the third indication information is used to indicate that bit sizes (size) of the DCIs of all the BWPs are the same or different, and the fourth indication information is used to indicate that formats (format) of the DCIs of all the BWPs are the same or different.

It is described in the foregoing embodiment that the DCI of the primary BWP may carry a CBIF field or carry information indicating whether sizes/formats of the DCIs are the same. In still another embodiment of this application, to indicate that the base station determines a relationship between a plurality of DCIs to be detected by the UE this time, both the CBIF field and the indication information may be carried in a DCI, or may be carried in each of the DCIs. Carrying manners may include an explicit manner and an implicit manner. Content of the DCIs determined by the base station based on different configuration manners is different. A plurality of cases are described in the following.

In a possible case, if DCIs of a plurality of BWPs configured by the base station are on a same CORESET of a same BWP, content of a new DCI may be shown in Table 1 when the content is carried in an explicit manner.

TABLE 1

| DCI | CBIF | SFI |
| --- | --- | --- |

In Table 1, DCI represents the existing DCI. A CBIF field and a size and format indicator (Size and Format Indicator, SFI) field are added based on an existing DCI. The CBIF field indicates a carrier and a BWP to which the existing DCI belongs, that is, a BWP of a carrier on which the existing DCI is detected. If the existing DCI is on a BWP of a same carrier, the CBIF field may include only a BWP indicator (BIF). The SFI field indicates whether sizes/formats of a plurality of DCIs detected this time are the same. As shown in Table 2, two bits are used to represent the SFI.

TABLE 2

| SFI | Meaning |
| --- | --- |
| 00 | Sizes and formats of a plurality of DC is are totally different. |
| 01 | Sizes of a plurality of DCIs are different, but formats of the plurality of DCIs are the same. |
| 10 | Sizes of a plurality of DCIs are the same, but formats of the plurality of DCIs are different. |
| 11 | Sizes and formats of a plurality of DCIs are all the same. |

The SFI field may also be divided into a size indicator (Size Indicator, SI) field and a format indicator (Format Indicator, FI) field. The SI field indicates whether sizes of a plurality of DCIs are the same, and the FI field indicates whether formats of a plurality of DCIs are the same. A value 1 indicates that the sizes or the formats of the plurality of DCIs are the same, and a value 0 indicates that the sizes or the formats of the plurality of DCIs are different, as shown in Table 3.

TABLE 3

| | Meaning |
| --- | --- |
| SI | |
| 0 | Sizes of a plurality of DCIs are different. |
| 1 | Sizes of a plurality of DCIs are different. |
| FI | |
| 0 | Formats of a plurality of DCIs are different. |
| 1 | Formats of a plurality of DCIs are the same. |

When a plurality of DCIs are on a same CORESET, the UE cannot determine which DCI is to be first detected, and which DCI is first detected. Therefore, each of the DCIs needs an SFI field, or an SI field and an FI field. In this way, the UE may detect subsequent DCIs based on a size/format of a first detected DCI, to reduce blind detection of subsequent DCIs.

In another possible case, if a plurality of DCIs are on different CORESETs of a same BWP, the UE can first detect a primary BWP. In this case, an SFI field, or an SI field and an FI field may be carried only in a DCI of the primary BWP, and a DCI of another BWP may not carry the SFI field, or the SI field and the FI field.

In still another possible case, if the DCIs are on CORESETs of respective BWPs, this BWP does not need to carry a DCI of another BWP, and a DCI of this BWP does not carry a CBIF of the DCI, but may carry a size/format field of the DCI. In an example in which the DCI carries the SI field and the FI field, if content of the DCI is carried in an explicit manner, the content of the DCI may be shown in Table 4.

TABLE 4

| DCI | SI | FI |
| --- | --- | --- |

In Table 4, an SI field and an FI field are added based on an existing DCI. Because the UE can first detect a DCI of a first BWP, the SI field and the FI field may be only in the DCI of the first BWP, and a DCI of another BWP may not carry the SI field and the FI field.

For Table 1 and Table 4, if indication is performed in an implicit manner, for example, different demodulation reference signals (Demodulation Reference Signal, DMRS) may be used to transmit a plurality of DCIs this time, implicitly indicating whether sizes/formats of a plurality of DCIs that need to be detected by the UE this time are the same. In this case, none of the DCIs may need to carry an SFI field, or none of the DCIs needs to carry an SI field and an FI field.

In this way, through explicit indication or implicit indication, the UE may know whether sizes/formats of a plurality of DCIs that need to be simultaneously detected are the same, and detect subsequent DCIs by using a size/format of a first detected DCI, further reducing blind detection performed by the UE. Therefore, after the UE detects the first DCI in the DCIs of all the BWPs based on the detection related information, if the UE determines, based on the first DCI, that bit sizes of the DCIs of all the BWPs are the same, the UE blindly detects another DCI based on a bit size of the first DCI. If the UE determines, based on the first DCI, that formats of the DCIs of all the BWPs are the same, the UE may blindly detect another DCI based on a format of the first DCI.

In still another embodiment of this application, the base station may further determine a total quantity or a quantity of a plurality of DCIs that are detected by the UE this time, and perform indication by using a DCI. A plurality of cases are also described herein.

In a possible case, if DCIs of a plurality of BWPs configured by the base station are on a same CORESET of a same BWP, content of a DCI may be shown in Table 5 when the content is carried in an explicit manner.

TABLE 5

| DCI | SI | FI |
| --- | --- | --- |

In Table 5, the DCI field represents content of an existing DCI. A CBIF field and a number indicator (Number Indicator, NI) field are added based on the existing DCI. The NI field indicates a quantity of a plurality of DCIs detected this time. In this way, the UE quits blind detection after completing detection of a quantity of DCIs indicated by the NI in a search space.

When a plurality of DCIs are on a same CORESET, the UE cannot determine which DCI is to be first detected, and which DCI is first detected. Therefore, each of the DCIs needs an NI field. In this way, the UE may detect subsequent DCIs based on a quantity indicated by a first detected DCI.

In another possible case, if a plurality of DCIs are on different CORESETs of a same BWP, the UE can first detect a DCI of a primary BWP. In this case, the NI field may appear only in the DCI of the primary BWP, and a DCI of another BWP may not carry the NI field.

In still another possible case, if the DCIs are on CORESETs of respective BWPs, this BWP does not need to carry a DCI of another BWP, and a DCI of this BWP does not carry a CBIF of the DCI, but may carry the NI field of the DCI. When content of the DCI is carried in an explicit manner, the content of the DCI may be shown in Table 6.

TABLE 6

| DCI | NI |
| --- | --- |

In Table 6, an NI field is added based on an existing DCI. Because the UE can first detect a DCI of a first BWP, the NI field may appear only in the DCI of the first BWP, and a DCI of another BWP may have no NI field.

Therefore, through explicit indication, the UE may know a quantity of a plurality of DCIs that need to be simultaneously detected, further reducing blind detection performed by the UE.

Therefore, in the DCI detection method provided in this application, sending resources of the DCIs of all the BWPs may be dynamically configured based on resource load of CORESETs of all the BWPs, to implement flexible detection of a plurality of DCIs. In addition, a relationship between a plurality of DCIs may be used to effectively detect another DCI, to reduce a quantity of times for blind detection of the DCIs.

The foregoing mainly describes the solutions provided in the embodiments of this application from a perspective of interaction between network elements. It may be understood that, to implement the foregoing functions, the network elements such as the terminal device and the network device include a corresponding hardware structure and/or software module that are/is used to perform each function. A person skilled in the art should easily be aware that, with reference to example units and algorithm steps described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, functional modules of the network device, the terminal device, and the like may be divided based on the foregoing method examples. For example, each functional module may be divided corresponding to each function, or two or more functions may be integrated into one processing module. The integrated module may be implemented in a form of hardware, or may be implemented in a form of a software functional module. It should be noted that, in the embodiments of this application, module division is an example, and is merely a logical function division. In actual implementation, another division manner may be used.

Figure 7:
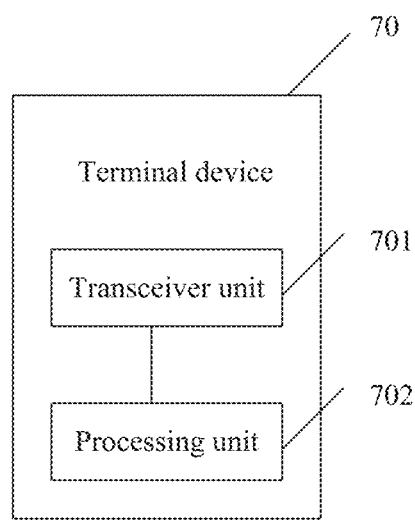
FIG. 7 is a schematic structural diagram of a terminal device according to an embodiment of this application.

When each functional module is obtained through division based on each corresponding function, FIG. 7 is a possible schematic structural diagram of the terminal device used in the foregoing embodiment. The terminal device 70 includes a transceiver unit 701 and a processing unit 702. The transceiver unit 701 is configured to support the terminal device in executing the process 502 in FIG. 5 and the process 603 in FIG. 6. The processing unit 702 is configured to support the terminal device in executing the process 503 in FIG. 5 and the process 604 in FIG. 6. All content related to the steps in the foregoing method embodiments may be cited in function description of corresponding functional modules, and details are not described herein again.

Figure 8:
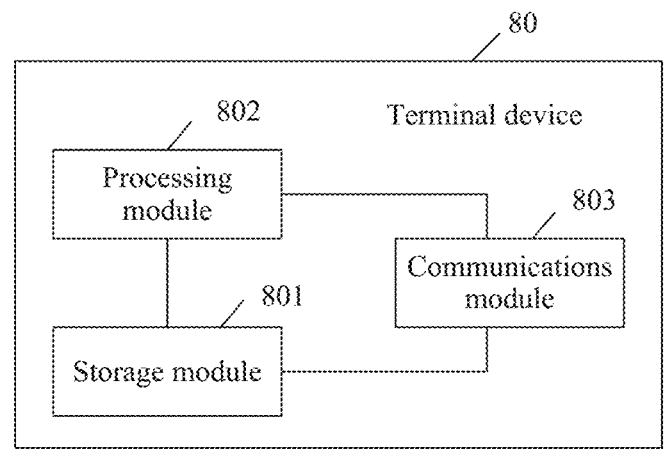
FIG. 8 is a schematic structural diagram of a terminal device according to an embodiment of this application.

When an integrated unit is used, FIG. 8 is a possible schematic structural diagram of the terminal device used in the foregoing embodiment. The terminal device 80 includes a processing module 802 and a communications module 803. The processing module 802 is configured to control and manage an action of the terminal device. For example, the processing module 802 is configured to support the terminal device in performing the process 503 in FIG. 5, the process 604 in FIG. 6, and/or another process used for the technology described in this specification. The communications module 83 is configured to support the terminal device in communicating with another network entity, for example, communicating with the functional module or the network entity shown in FIG. 2. The terminal device may further include a storage module 801, configured to store program code and data of the terminal device.

The processing module 802 may be a processor or a controller, for example, may be a central processing unit (Central Processing Unit, CPU), a general-purpose processor, a digital signal processor (Digital Signal Processor, DSP), an application-specific integrated circuit (Application-Specific Integrated Circuit, ASIC), a field programmable gate array (Field Programmable Gate Array, FPGA), or another programmable logic device, a transistor logic device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of the DSP and a microprocessor. The communications module 803 may be a transceiver, a transceiver circuit, a communications interface, or the like. The storage module 801 may be a memory.

Figure 9:
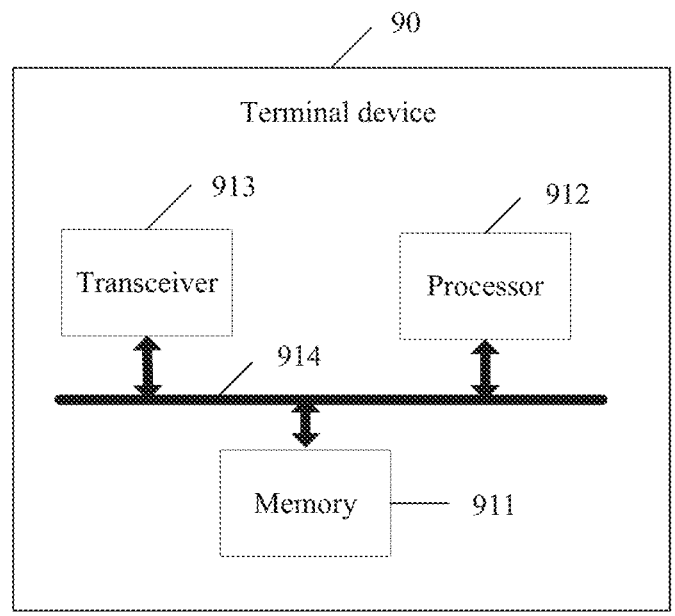
FIG. 9 is a schematic structural diagram of a terminal device according to an embodiment of this application.

When the processing module 802 is a processor, the communications module 803 is a transceiver, and the storage module 801 is a memory, the terminal device used in the embodiments of this application may be the terminal device shown in FIG. 9.

Referring to FIG. 9, the terminal device 90 includes a processor 912, a transceiver 913, a memory 911, and a bus 914. The transceiver 913, the processor 912, and the memory 911 are connected to each other by using the bus 914. The bus 914 may be a peripheral component interconnect (Peripheral Component Interconnect, PCI) bus, an extended industry standard architecture (Extended Industry Standard Architecture, EISA) bus, or the like. The bus may be classified into an address bus, a data bus, a control bus, and the like. For ease of representation, only one thick line is used to represent the bus in FIG. 9, but this does not mean that there is only one bus or only one type of bus.

Figure 10:
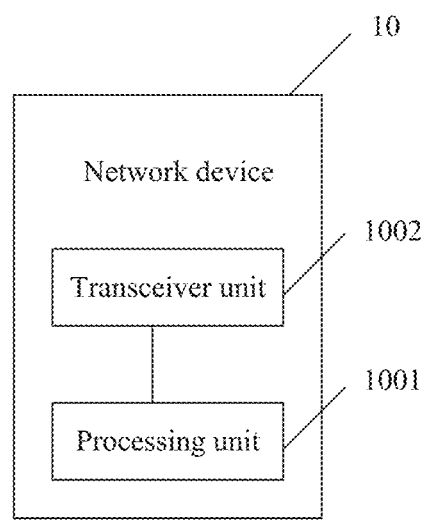
FIG. 10 is a schematic structural diagram of a network device according to an embodiment of this application.

When each functional module is obtained through division based on each corresponding function, FIG. 10 is a possible schematic structural diagram of the network device used in the foregoing embodiment. The network device 10 includes a processing unit 1001 and a transceiver unit 1002. The processing unit 1001 is configured to support the network device in executing the process 501 in FIG. 5 and the processes 601 and 602 in FIG. 6. The transceiver unit 1002 is configured to support the network device in executing the process 502 in FIG. 5 and the process 603 in FIG. 6. All content related to the steps in the foregoing method embodiments may be cited in function description of corresponding functional modules, and details are not described herein again.

Figure 11:
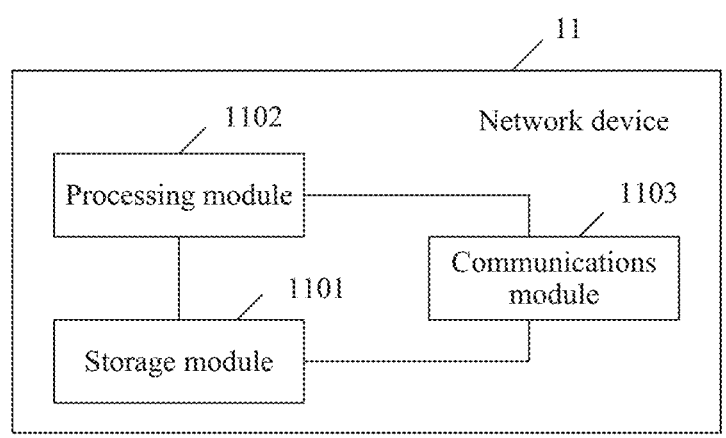
FIG. 11 is a schematic structural diagram of a network device according to an embodiment of this application.

When an integrated unit is used, FIG. 11 is a possible schematic structural diagram of the network device used in the foregoing embodiment. The network device 11 includes a processing module 1102 and a communications module 1103. The processing module 1102 is configured to control and manage actions of the network device. For example, the processing module 1102 is configured to support the network device in executing the process 501 in FIG. 5, the process 601 in FIG. 6, and/or another process used for the technology described in this specification. The communications module 1103 is configured to support the network device in communicating with another network entity, for example, communicating with the functional module or the network entity shown in FIG. 3. The network device 11 may further include a storage module 1101, configured to store program code and data of the network device.

The processing module 1102 may be a processor or a controller, for example, may be a CPU, a general-purpose processor, a DSP, an ASIC, an FPGA, or another programmable logic device, a transistor logic device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of the DSP and a microprocessor. The communications module 1103 may be a transceiver, a transceiver circuit, a communications interface, or the like. The storage module 1101 may be a memory.

Figure 12:
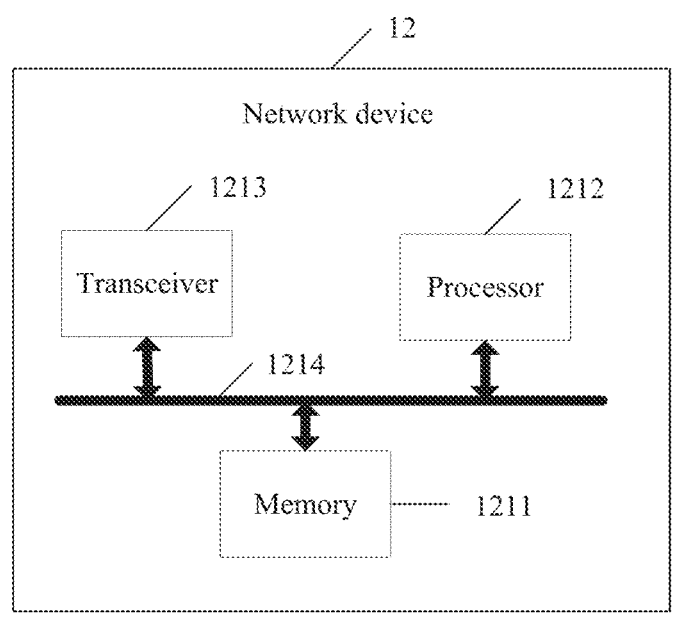
FIG. 12 is a schematic structural diagram of a network device according to an embodiment of this application.

When the processing module 1102 is a processor, the communications module 1103 is a transceiver, and the storage module 1101 is a memory, the network device used in the embodiments of this application may be the network device shown in FIG. 12.

Referring to FIG. 12, the network device 12 includes a processor 1212, a transceiver 1213, a memory 1211, and a bus 1214. The transceiver 1213, the processor 1212, and the memory 1211 are connected to each other by using the bus 1214. The bus 1214 may be a PCI bus, an EISA bus, or the like. The bus may be classified into an address bus, a data bus, a control bus, and the like. For ease of representation, only one thick line is used to represent the bus in FIG. 12, but this does not mean that there is only one bus or only one type of bus.

Method or algorithm steps described with reference to the content disclosed in this application may be implemented by hardware, or may be implemented by a processor by executing a software instruction. The software instruction may include a corresponding software module. The software module may be stored in a random access memory (Random Access Memory, RAM), a flash memory, a read-only memory (Read Only Memory, ROM), an erasable programmable read only memory (Erasable Programmable ROM, EPROM), an electrically erasable programmable read only memory (Electrically EPROM. EEPROM), a register, a hard disk, a removable hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be located in the ASIC. In addition, the ASIC may be located in a core network interface device. Certainly, the processor and the storage medium may exist in the core network interface device as discrete components.

A person skilled in the art should be aware that in the foregoing one or more examples, functions described in this application may be implemented by hardware, software, firmware, or any combination thereof. When the functions are implemented by software, these functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or special-purpose computer.

The foregoing descriptions are merely specific implementations of the present invention, but are not intended to limit the protection scope of the present invention. Any variation or replacement within the technical scope disclosed in the present invention shall fall within the protection scope of the present invention. Therefore, the protection scope of the present invention shall be subject to the protection scope of the claims.

What is claimed is:

1. A downlink control information detection method implemented by a terminal device, wherein the downlink control information detection method comprises:
   receiving, from a single network device, detection related information for detecting downlink control information (DCIs) of all activated bandwidth parts (BWPs) corresponding to the single network device and the terminal device, wherein the detection related information is based on respective resource loads of respective control resource sets of the activated BWPs corresponding to the single network device and the terminal device; and
   detecting the DCIs based on the detection related information.

2. The downlink control information detection method of claim 1, wherein the detection related information comprises information about a control resource set, an aggregation level set, a scale factor, or a detection period that are required for detecting the DCIs, and wherein the information about the control resource set comprises a frequency domain resource of the control resource set, a start orthogonal frequency division multiplexing (OFDM) symbol, a duration, or a detection period.

3. The downlink control information detection method of claim 1, wherein the detection related information further comprises an identifier or an index of a first BWP in the activated BWPs, and wherein the identifier or the index indicates that the DCIs of the activated BWPs are on resources of a control resource set of the first BWP.

4. The downlink control information detection method of claim 1, wherein the detection related information further comprises first indication information that indicates whether transmission resources of the DCIs of the activated BWPs are on resources of a same control resource set of a same BWP and indicates whether search spaces of the DCIs of the activated BWPs are the same or different.

5. The downlink control information detection method of claim 4, wherein the detection related information further comprises second indication information, wherein the second indication information indicates that transmission resources of the DCIs of the activated BWPs are sent on resources of control resource sets of respective BWPs, and wherein the second indication information comprises an identifier or an index of a first detected BWP in the activated BWPs.

6. The downlink control information detection method of claim 5, wherein detecting the DCIs based on the detection related information comprises:
   detecting, based on the detection related information, a DCI of a BWP that is indicated by the identifier or the index when the terminal device determines that the control resource sets are different; or
   detecting a DCI of a primary BWP in the activated BWPs.

7. The downlink control information detection method of claim 5, wherein detecting the DCIs based on the detection related information comprises obtaining, based on the detection related information and according to a formula, a control channel element (CCE) occupied by any candidate physical downlink control channel (PDCCH) of the search spaces of the DCIs of the activated BWPs when the terminal device determines that either the control resource sets are different, or the control resource sets are the same and the search spaces are the same, wherein the formula comprises:

$$L\{(Y_k+m') \bmod \lfloor N_{CCE,k}/L \rfloor\}+i, m'=m,$$

wherein L represents a size of an aggregation level, wherein $N_{CCE,k}$ represents a quantity of CCEs in a control area comprised in a detection occasion k, wherein i=0, ..., L−1, m=0, ..., $M^{(L)}$−1, wherein $M^{(L)}$ represents a quantity of candidate PDCCHs that need to be monitored in the search spaces wherein $Y_k=(A \cdot Y_{k-1}) \bmod D$, $Y_{-1}=n_{RNTI} \neq 0$, wherein A=39827, D=65537, wherein k=$\lfloor n_s/2 \rfloor$, and wherein $n_s$ represents a slot number in a system frame.

8. The downlink control information detection method of claim 5, wherein detecting, by the terminal device, the DCIs based on the detection related information comprises obtaining, based on the detection related information and according to a formula, a control channel element (CCE) occupied by any candidate physical downlink control channel (PDCCH) of the search spaces when the terminal device determines that the control resource sets are the same and the search spaces are different, wherein the formula comprises:

$$L\{(Y_k+m') \bmod \lfloor N_{CCE,k}/L \rfloor\}+i, m'=m+M^{(L)} \cdot n_{CBI},$$

wherein L represents a size of an aggregation level, wherein $N_{CCE,k}$ represents a quantity of CCEs in a control area comprised in a detection occasion k, wherein i=0, ..., L−1, m=0, ..., $M^{(L)}$−1, wherein $M^{(L)}$ represents a quantity of candidate PDCCHs that need to be monitored in the search spaces, wherein $Y_k=(A \cdot Y_{k-1}) \bmod D$, $Y_{-1}=n_{RNTI} \neq 0$, wherein A=39827, wherein D=65537, wherein k=$\lfloor n_s/2 \rfloor$, wherein $n_s$ represents a slot number in a system frame, and $n_{CBI}$ wherein represents a parameter obtained based on a carrier index and a BWP index.

9. The downlink control information detection method of claim 1, wherein detecting the DCIs based on the detection related information comprises detecting, based on a first DCI of the DCIs, a second DCI after detecting the first DCI based on the detection related information.

10. The downlink control information detection method of claim 9, wherein the first DCI comprises a carrier identifier or index of a BWP of the first DCI, a second identifier or index of the BWP of the first DCI, or both the carrier identifier or index and the second identifier or index.

11. The downlink control information detection method of claim 9, wherein the first DCI comprises a total quantity of the DCIs, third indication information, and fourth indication information, wherein the third indication information indicates whether bit sizes of the DCIs are the same or different, and wherein the fourth indication information indicates whether formats of the DCIs are the same or different.

12. The downlink control information detection method of claim 9, wherein detecting, based on the first DCI, the second DCI comprises blindly detecting the second DCI based on a bit size of the first DCI when the terminal device determines, based on the first DCI, that bit sizes of the DCIs are the same.

13. The downlink control information detection method of claim 9, wherein detecting, based on the first DCI, the second DCI comprises blindly detecting the second DCI based on a format of the first DCI when the terminal device determines, based on the first DCI, that formats of the DCIs are the same.

14. The downlink control information detection method of claim 9, wherein detecting, based on the first DCI, the second DCI comprises current detection after completing blind detection of a total quantity of the DCIs.

15. A terminal device, comprising:
a transceiver configured to receive, from a single network device, detection related information for detecting of downlink control information (DCIs) of all activated bandwidth parts (BWPs) corresponding to the single network device and the terminal device, wherein the detection related information is based on respective resource loads of respective control resource sets of the activated BWPs corresponding to the single network device and the terminal device; and
a processor coupled to the transceiver and configured to detect the DCIs based on the detection related information.

16. The terminal device of claim 15, wherein the detection related information comprises information about a control resource set, an aggregation level set, a scale factor, or a detection period that are required for detecting the DCIs, and wherein the information about the control resource set comprises a frequency domain resource of the control resource set, a start orthogonal frequency division multiplexing (OFDM) symbol, a duration, or a detection period.

17. The terminal device of claim 15, wherein the detection related information further comprises an identifier or an index of a first BWP in the activated BWPs, and wherein the identifier or the index of the first BWP indicates that the DCIs are on resources of a control resource set of the first BWP.

18. The terminal device of claim 15, wherein the detection related information further comprises first indication information that indicates that transmission resources of the DCIs are on resources of a same control resource set of a same BWP and indicates that search spaces of the DCIs are the same or different.

19. The terminal device of claim 18, wherein the detection related information further comprises second indication information that indicates that transmission resources of the DCIs are sent on resources of control resource sets of respective BWPs of the activated BWPs, and wherein the second indication information comprises an identifier or index of a first detected BWP in the activated BWPs.

20. A single network device, comprising:
a processor configured to determine, based on a load of control resource sets of all activated bandwidth parts (BWPs) corresponding to the single network device and a terminal device, detection related information for detecting downlink control information (DCIs) of the activated BWPs corresponding to the single network device and the terminal device; and
a transceiver configured to send the detection related information to the terminal device.

* * * * *

UNITED STATES PATENT AND TRADEMARK OFFICE
CERTIFICATE OF CORRECTION

PATENT NO. : 11,323,992 B2
APPLICATION NO. : 16/638823
DATED : May 3, 2022
INVENTOR(S) : Zhuang et al.

It is certified that error appears in the above-identified patent and that said Letters Patent is hereby corrected as shown below:

In the Claims

Claim 8, Column 24, Lines 48 and 49: "and $n_{CBI}$ wherein represents" should read "and $n_{CBI}$ represents"

Signed and Sealed this
Twenty-eighth Day of June, 2022

Katherine Kelly Vidal
*Director of the United States Patent and Trademark Office*